No. 856,820. PATENTED JUNE 11, 1907.
E. B. STIMPSON.
MEASURING INSTRUMENT.
APPLICATION FILED SEPT. 14, 1906.
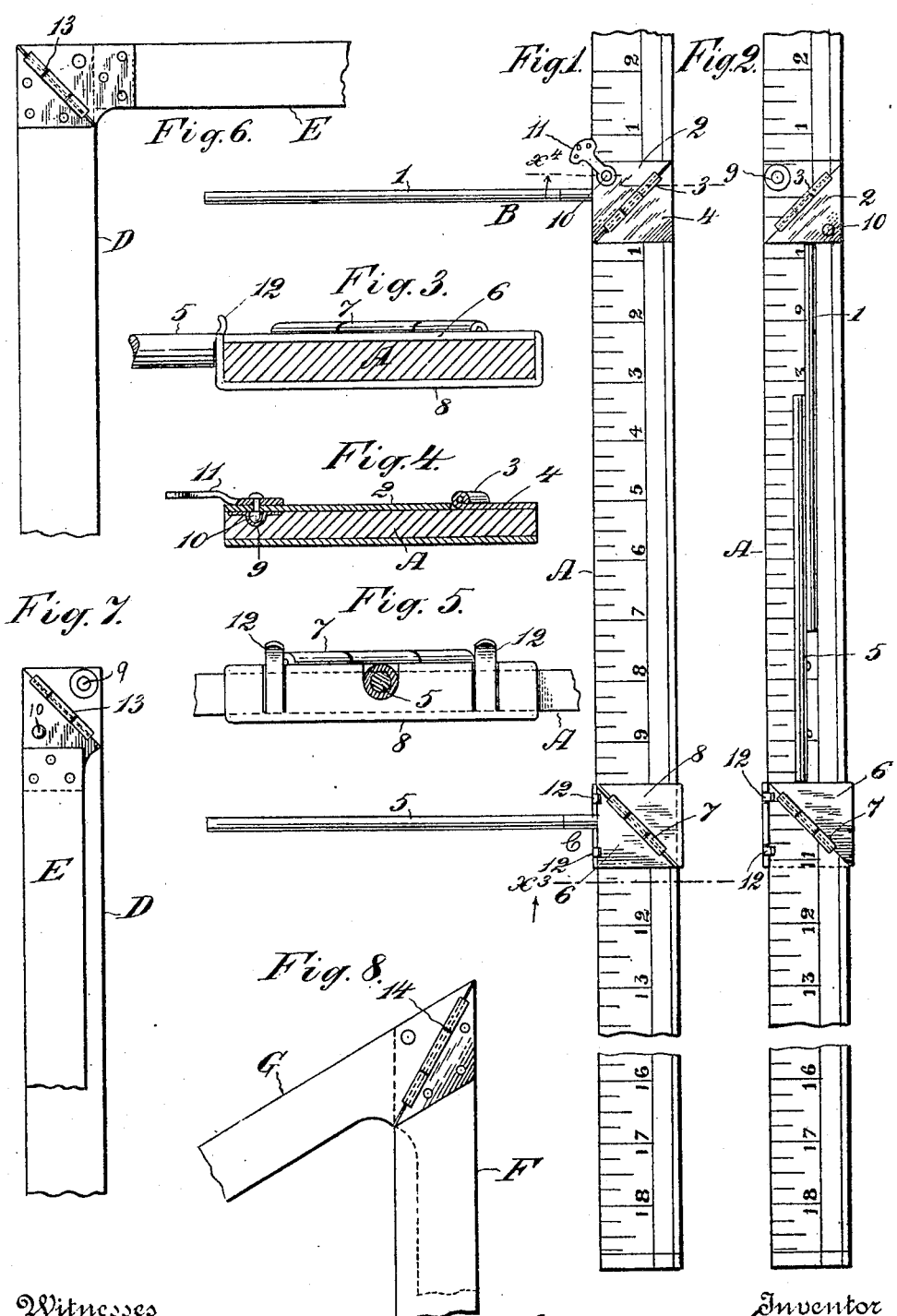

UNITED STATES PATENT OFFICE.

EDWIN BALL STIMPSON, OF NEW YORK, N. Y., ASSIGNOR TO THE BELCHER BROTHERS COMPANY, A CORPORATION OF NEW JERSEY.

MEASURING INSTRUMENT.

No. 856,820.  Specification of Letters Patent.  Patented June 11, 1907.

Application filed September 14, 1906. Serial No. 334,660.

*To all whom it may concern:*

Be it known that I, EDWIN BALL STIMPSON, a citizen of the United States, residing in the borough of Brooklyn, in the county of Kings, city and State of New York, have invented certain new and useful Improvements in Measuring Instruments, of which the following is a specification.

This invention relates to the class of measuring devices to which belong tailor's measures, carpenter's squares, and the like, where there is an arm or arms which project out at an angle to the main stem or member of the instrument or device. This construction produces an instrument of bulky character, and one which when constructed of wood, is liable to be broken. To obviate this difficulty such instruments have been made with detachable arms and folding arms, but so far as applicant is aware none of these have heretofore been entirely satisfactory nor of general application.

The object of the present invention is to provide a square having a main stem or member and a hinged arm or arms thereon, the latter being so hinged as to fold over flat on the main member when not in use or when packed for shipment. The arm member may be slidable along the main member, or a permanent and a sliding arm member may be mounted on the main member. The arms may be simply rods—as in some tailors' measures,—or they may be flat, of wood or metal, and they may be graduated.

In the accompanying drawings, which illustrate an embodiment of the invention— Figure 1 is a side view of a tailor's measure embodying the invention, and Fig. 2 is a similar view showing the arms folded on the main member. Fig. 3 is a cross-section on a larger scale, taken at $x^3$ in Fig. 1. Fig. 4 is a transverse section on a large scale taken at $x^4$ in Fig. 1. Fig. 5 is a face view of the parts seen in Fig. 3. Fig. 6 is a view similar to Fig. 1 showing the arm or folding member flat; and Fig. 7 shows the same with the arm folded flat on the main member. Fig. 8 illustrates a form of the measuring device or instrument where the arm-member projects from the main member at an angle less than a right-angle, and the hinging axis is less than forty-five degrees.

Referring primarily to the first four figures of the drawing—A designates the main member, and B and C the arm-members mounted thereon. The upper arm-member B, in this instance, is capable of folding but not of sliding on the main member, but the lower arm-member C is not only capable of folding but is slidably mounted on the main member A. When in operative position the arms project, ordinarily, at right-angles to the main member.

Referring to the arm-member B, this consists of a rod or bar 1, secured rigidly to a metal plate 2, hinged at 3 to a plate 4 fixed to the member A. It will be noted that the hinging line is oblique to the axes of the members A and B; indeed its obliquity is forty-five degrees with the axis of the member A as herein shown, and consequently when the arm B is folded, it will lie, as seen in Fig. 2, on the face of the member A. Also, when the arm projects out, as in Fig. 1, from the main member, the plate 2 rests on and is supported by an extension of the main member beyond the hinging line. The arm, for this reason, can only fold over on one side or face of the main member and is supported thereon in both of its positions. This is an important feature of the invention and it exists in all of the forms of the invention shown in the drawings.

The slidable arm-member C comprises a rod or bar 5, fixed rigidly to a plate 6 which is hinged at 7 along an oblique hinging line to a slide 8, which embraces the member A in a slidable manner. The obliquity of the hinging line is here shown as forty-five degrees, and as opposite to that of the hinge 3, so that the arms will fold toward each other; but this is not essential to the invention.

When the angular plate 2 of the arm-member B is in the position seen in Fig. 1—that is, with the arm-member B extended and in operative position—means are herein shown for holding it in place with sufficient tenacity to prevent the arm from folding or swinging about the hinge 3 when the instrument is in use. This fastening device consists of a slightly springy metal socket 9 set in the wood of the member A (Fig. 4) and a stud 10, with a rounded head set in the plate 2 in position to snap into the socket 9, in the manner of a glove-fastener, when the plate 2 is pressed down. In the present case the outer end of the stud 10 is utilized for loosely attaching to the measuring instrument a metal tab 11, which provides for the attachment of a tape-measure, not shown. The engagement of the rounded head of the stud 10 with the socket 11 is frictional and a moderate pull will disengage the plate 2 for folding.

The securing means of the plate 6 of the arm-member C is also frictional. On the upright edge of the sheet-metal slide 8 are formed, by slitting, two spring latches or clips 12, (Figs. 3 and 5) and these engage the edge of the plate 6 when the latter is pressed down, thus holding said arm against accidental movement, except that of sliding on the main member.

Figs. 6 and 7 illustrate the application of the oblique folding hinge to a square, which latter may be of wood or metal. In these views, D designates the main member of the square and E the arm-member. The oblique hinge 13 is in substance the same as the hinge 3 of Fig. 1. Fig. 7 shows the flat arm-member E folded on the main member D. The securing device may be the same in substance as that already described with reference to the arm-member B; that is to say, a springy socket on one part adapted to receive the bulbous head of a stud on the other part.

The embodiment shown in Fig. 8 is designed to illustrate a construction wherein the arm-member G is not intended to project at a right angle from the main member F, and therefore the axis of the hinge 14 must have a corresponding obliquity with the axis of the member F, in order that the member G may fold, as indicated by dotted lines in Fig. 8, onto the member F, and not project beyond it.

Obviously there may be one or more arm-members hinged on the main member of the measuring device or instrument, and where there is a sliding arm-member it may be hinged so as to fold in either direction onto the face of the main member.

It will be noted that in an instrument constructed according to this invention two important advantages are attained, namely: the parts fold flatwise together and therefore compactly, and the members are always connected, so that they cannot become separated and mislaid or lost.

Another important feature is the support before referred to, of the hinge-member of the arm on an extension of the main member when the arm is extended.

Of course the members seen in Figs. 6, 7 and 8 may have on them graduation marks, but these have been omitted as not constituting any part of the present invention.

Obviously the hinge with its hinging axis disposed obliquely to the axes of the parts hinged together, may be employed for other instruments requiring to be folded compactly.

Having thus described my invention, I claim—

1. An instrument for the purpose specified, having two elongated members, and a hinge connecting the same, the hinging axis of which is oblique to the longitudinal axes of both members, one of said members extending out beyond the hinging line and forming a support for the hinge-plate of the other member when the latter is extended.

2. An instrument for the purpose specified, having two elongated members, and a hinge connecting the same, the hinging axis of which is oblique to the longitudinal axes of both members, so that one member may be folded over onto the face of the other when the instrument is not in use, one of said members extending beyond the hinging line to form a support for the hinge-plate of the other member when the latter is extended, and means for locking said hinge-plate to the part on which it rests.

3. An instrument for the character described, having a flat main member, an arm-member, a hinge connecting the same, the hinging axis of which is oblique to the axes of both of said members, said hinge having two plates, one of which is attached to the main member and the other to the arm-member, the main member extending out beyond the hinging line, a socket 9 in said extended portion, and a stud 10 on the hinge-plate of the arm-member in such a position as to enter said socket when the latter member is extended, and lock the parts together.

4. An instrument for the purpose specified, having a flat main member, an arm-member slidable on the main member and connected therewith through a hinge for folding, and the said hinge, having its hinging axis oblique to the axes of both of said members so that it may be folded, when not in use, into position parallel with the main member.

5. An instrument for the purpose specified, having a flat main member A, an arm-member B hinged to the main member in a manner to fold over flat upon the same, a slidable arm-member C, comprising a bar 5, fixed rigidly to a plate 6, the said plate hinged along an oblique line to a slidable hinge-member 8 embracing the member A, the said slide, and means for locking said sliding member to the plate 6 when the arm is extended.

In witness whereof I have hereunto signed my name this 13th day of September 1906, in the presence of two subscribing witnesses.

EDWIN BALL STIMPSON.

Witnesses:
HENRY CONNETT,
WILLIAM J. FIRTH.